United States Patent [19]

Chamberlin

[11] 4,292,197

[45] Sep. 29, 1981

[54] METHOD OF PREPARING ELECTROCATALYST FOR AN OXYGEN DEPOLARIZED CATHODE ELECTROLYTIC CELL

[75] Inventor: Ronald D. Chamberlin, Wadsworth, Ohio

[73] Assignee: PPG Industries, Inc., Pittsburgh, Pa.

[21] Appl. No.: 82,842

[22] Filed: Oct. 9, 1979

[51] Int. Cl.³ .................... B01J 23/50; B01J 21/18; C25B 11/14; C25B 11/02
[52] U.S. Cl. ..................... 252/425.3; 204/290 R; 204/294; 252/430; 264/105; 427/113
[58] Field of Search ............... 252/425.3, 430, 182.1, 252/510, 511; 204/290 R, 294; 427/115, 221, 113; 429/42, 44; 264/104, 105

[56] References Cited

U.S. PATENT DOCUMENTS

| Re. 28,379 | 3/1975 | Backhurst et al. | 204/20 |
|---|---|---|---|
| 3,352,719 | 11/1967 | Schneider | 252/425.3 |
| 3,457,152 | 7/1969 | Malomey Jr. et al. | 204/131 |
| 3,527,617 | 9/1970 | Prober | 136/86 |
| 3,616,356 | 10/1971 | Roy | 204/152 |
| 3,654,098 | 4/1972 | Backhurst et al. | 204/20 |
| 3,716,459 | 2/1973 | Salter | 204/1 R |
| 3,755,114 | 8/1973 | Taryanyi et al. | 204/114 |
| 3,761,383 | 9/1973 | Backhurst et al. | 204/268 |
| 3,769,093 | 10/1973 | Jones | 427/115 |
| 3,888,974 | 6/1975 | Stevens | 252/430 |
| 3,915,822 | 9/1975 | Veltman | 204/151 |
| 3,919,062 | 11/1975 | Lundqvist, Jr. et al. | 204/149 |
| 3,941,669 | 3/1976 | Bharucha et al. | 204/105 R |
| 3,945,892 | 3/1976 | James et al. | 204/1 R |
| 3,966,571 | 6/1976 | Gagnon et al. | 204/149 |
| 3,974,049 | 8/1976 | James et al. | 204/106 |
| 3,981,787 | 9/1976 | James et al. | 204/252 |
| 4,031,033 | 6/1977 | Budevski et al. | 252/425.3 |
| 4,073,707 | 2/1978 | Spaziante et al. | 204/105 R |
| 4,118,292 | 10/1978 | Fray | 204/67 |
| 4,124,453 | 11/1978 | Fleischmann et al. | 204/1 R |
| 4,147,839 | 4/1979 | Solomon | 429/15 |
| 4,163,811 | 8/1979 | Kohlmayr et al. | 252/430 |
| 4,177,116 | 12/1979 | DeNora et al. | 204/98 |
| 4,244,793 | 1/1981 | Johnson et al. | 204/98 |

*Primary Examiner*—P. E. Konopka
*Attorney, Agent, or Firm*—Richard M. Goldman

[57] ABSTRACT

Disclosed is a method of preparing a cathodic electrocatalyst where the cathode is a bed of porous particles having $HO_2^-$ disproportionation catalyst dispersed on the surfaces and pores thereof.

6 Claims, 4 Drawing Figures

METHOD OF PREPARING ELECTROCATALYST FOR AN OXYGEN DEPOLARIZED CATHODE ELECTROLYTIC CELL

DESCRIPTION OF THE INVENTION

Chlorine and alkali metal hydroxide, for example, sodium hydroxide, and potassium hydroxide, are commercially prepared, by the electrolysis of the corresponding alkali metal chloride brines in an electrolytic cell. In one type of cell, where the anode is separated from the cathode by an ion permeable barrier, chlorine is evolved at the anode according to the reaction:

$$2Cl^- \rightarrow Cl_2 + 2e^-$$

while hydroxyl ion is produced at the cathode according to $$2H_2O + 2e^- \rightarrow H_2 + 2OH^-$$

which is actually a multi-step reaction in which a hydrogen species is adsorbed onto the surface of the cathode and the hydrogen molecule is desorbed therefrom.

The total hydrogen reaction, as a series of postulated adsorption and desorption steps, consumes about 1.2 volts, such that if the cathode in a chlorine cell is depolarized with oxygen instead of being allowed to evolve hydrogen, a savings of about 1.2 volts is possible. The cathodes previously developed for utilization of oxygen as a depolarizer were characterized by a structure of a thin sandwich of a microporous separator of plastic combined with a catalyzed layer, wet-proofed with, e.g., polytetrafluoroethylene, and pressed onto a wire screen current collector. In the prior art depolarized cathodes, oxygen is fed into the catalyst zone through the microporous backing. Such cathodes work. However, they suffered from various deficiencies, including separation or delamination of the various layers and flooding of the microporous layer.

It has been found as described in the commonly assigned, co-pending application of Johnson and Chamberlin for FIXED BED OXYGEN DEPOLARIZED CATHODE ELECTROLYTIC CELL that if the cathode is a bed of particles immersed in the catholyte liquor, through which catholyte liquor oxygen is bubbled, the deficiencies of the prior art microporous cathodes may be substantially eliminated.

It has further been found that in the method and the electrolytic cell for carrying out the herein contemplated method, the current collector may be a wire screen surrounded by the catalyzed wetproofed particles. It has also been found that the current collector may be a wire mesh bag, wire mesh container or the like, surrounding the catalyzed wet-proofed catalyzed particles and containing them therein.

According to the method of this invention, it has been found that a particularly desirable cathode catalyst material may be prepared by preparing a slurry of activated carbon and an $HO_2^-$ disproportionation catalyst precursor, vacuum impregnating the activated carbon with the disproportionation catalyst precursor to form a slurry, drying the slurry, heating the dried product to a temperature sufficient to decompose the catalyst precursor and form the catalyst, mixing the dried, impregnated carbon product with a hydrophobic agent, vacuum impregnating the hydrophobic agent into the activated carbon having the disproportionation catalyst impregnated therein, drying the second slurry formed thereby, and heating the dried particles to a temperature sufficient to sinter the hydrophobic agent.

THE FIGURES

DETAILED DESCRIPTION OF THE INVENTION

Figure 1:
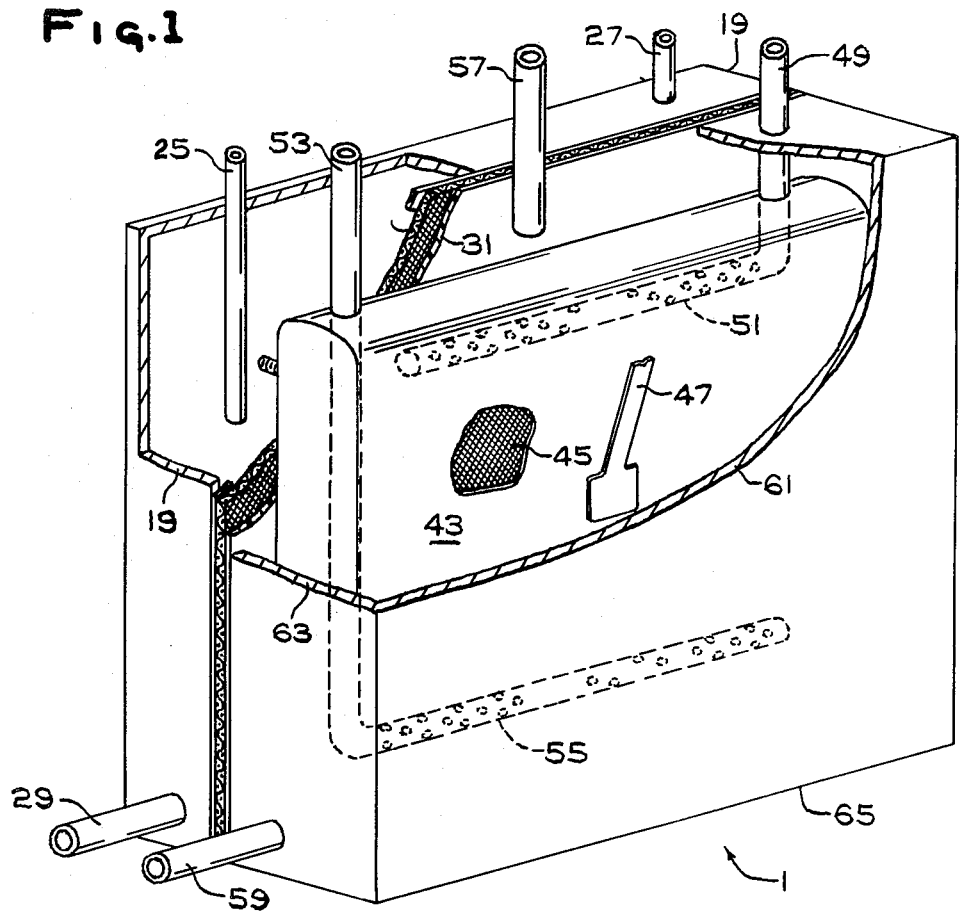
FIG. 1 is an isometric view of an electrolytic cell useful in carrying out the method of this invention, shown in partial cut-away.

The cathodic reaction $$2H_2O + 2e^- \rightarrow H_2 + 2OH^-$$

is actually reported to be a two-step reaction where the first step is $$H_2O + e^- \rightarrow H_{ads} + OH^-$$

and the second step is either $$2H_{ads} \rightarrow H_2$$

or $$H_{ads} + H_2O + e^- \rightarrow H_2 + OH^-.$$

While the exact hydrogen desorption step may be either of the two above reactions, the reaction itself consumes about 1.2 volts. Thus, a voltage reduction of about 1.2 volts is possible if the cathode in a chlorine cell is depolarized with oxygen instead of being allowed to evolve hydrogen.

The use of oxygen or other oxidant as a depolarizer results in the cathode reaction $$O_2 + 2e^- + H_2O \rightarrow HO_2^- + OH^-$$

followed by the reaction $$HO_2^- + H_2O + 2e^- \rightarrow 3OH^-$$

which yields the total reaction $$O_2 + 2H_2O + 4e^- \rightarrow 4OH^-.$$

The reaction of oxygen with water to form $HO_2^-$ and hydroxyl ion is typically carried out on a catalyst such as carbon, a transition metal or a metal of Group IB, IIIA, IVA or VA of the Periodic Table of the Elements.

The reaction of $HO_2^-$, with water and two electrons, to yield three hydroxyl ions, is typically carried out on a catalytic surface, for example, a surface of the Group VIII transition metal or a metal of Groups IB, IIIA, IVA or VA of the Periodic Table of the Elements.

According to the method of Johnson and Chamberlin, an aqueous alkali metal chloride brine is fed to an electrolytic cell having an anolyte compartment with an anode therein, and a catholyte compartment with cathode means therein, and an ion permeable barrier therebetween. Typically, the anode is a valve metal, for example, titanium, tantalum, tungsten, columbium, or the like, with a suitable electrocatalytic surface thereon. Suitable anodic electrocatalytic surfaces are well known in the art and include transition metals, oxides of transition metals, compounds of transition metals, especially platinum group metals, oxides of platinum group metals, and compounds of platinum group metals. Especially preferred are compounds of oxides of platinum group metals with oxides of the valve metals, that is, titanium, tantalum, tungsten, columbium and the like.

The ion permeable barrier may be an electrolyte permeable diaphragm, for example, a deposited asbestos diaphragm, a preformed asbestos diaphragm, or a microporous synthetic diaphragm. Alternatively, the ion permeable barrier may be ion permeable but electrolyte impermeable as a cation selective permionic membrane. Typically, cation selective permionic membranes are fluorocarbon polymers having pendent acid groups thereon. Typical pendent acid groups include sulfonic acid groups, carboxylic acid groups, phosphonic acid groups, phosphoric acid groups, precursors thereof, and reaction products thereof.

The anolyte liquor is typically a brine containing from about 120 to about 250 grams per liter of sodium chloride or from about 180 to about 370 grams per liter of potassium chloride, and is typically at a pH of from about 1.5 to about 5.5. The brine feed is typically a saturated or substantially saturated brine, containing from about 300 to about 325 grams per liter of sodium chloride or from about 450 to about 500 grams per liter of potassium chloride. The catholyte liquor recovered from the electrolytic cell may be a catholyte liquor containing approximately 10 to 12 weight percent sodium hydroxide and 15 to 25 weight percent sodium chloride, or approximately 15 to 20 weight percent potassium hydroxide and approximately 20 to 30 weight percent potassium chloride, as where an electrolyte permeable barrier is utilized. Alternatively, the catholyte product may contain from about 10 to about 45 weight percent sodium hydroxide, or about 15 to about 65 weight percent potassium hydroxide, as where the ion permeable barrier is a cation selective permionic membrane interposed between the anode and the cathode.

An oxidant, for example, oxygen, air or oxygen-enriched air, is fed to the catholyte compartment as an electrical current is fed from the cathode compartment to the anode compartment, whereby to provide an anode product of chlorine and a cathode product of alkali metal hydroxide, characterized by the substantial absence of gaseous hydrogen product. Applicant's invention is particularly directed to the preparation of the cathode means for carrying out the reaction, which cathode means comprise porous particles having $HO_2^-$ disproportionation catalyst areas thereon.

Applicant's invention contemplates the use of electroconductive catalytic particles by first forming a slurry of activated carbon and the precursor of an $HO_2^-$ disproportionation catalyst, impregnating the activated carbon with the precursor of the $HO_2^-$ disproportionation catalyst, and then drying the slurry whereby to form a dried, impregnated carbon product. Thereafter, the dried, impregnated carbon product is mixed with a dispersion of a hydrophobic compound in order to form a second slurry. The catalyst-containing carbon product is then impregnated with the hydrophobic compound, and the hydrophobic compound and catalyst-containing activated carbon particles are then dried whereby to form dried carbon particles having both an $HO_2^-$ disproportionation catalyst and a hydrophobic material impregnated therein.

The porous particle is comprised of a porous electroconductive substrate having an $HO_2^-$ disproportionation catalyst on the surface thereof. As herein contemplated, the $HO_2^-$ disproportionation catalyst may be both on the external surface of the porous electroconductive substrate as well as on the internal pores thereof. The $HO_2^-$ disproportionation catalyst is a different material than the substrate, with the substrate being carbonaceous. The carbonaceous substrate is typically an activated carbon having a surface area of from about 100 to about 1,000 square meters per gram, and preferably from about 100 to about 500 square meters per gram, with surface areas of from about 200 to 400 square meters per gram being particularly preferred.

The $HO_2^-$ disproportionation catalyst is a transition metal having hydrogen adsorption properties. Such metals are chosen from the group consisting of chromium, molybdenum, tungsten, manganese, technetium, rhenium, iron, cobalt, nickel, ruthenium, rhodium, palladium, osmium, iridium, platinum, copper, silver, gold, zinc, cadmium, aluminum, indium, tin, lead, arsenic, antimony, bismuth, selenium, tellurium, mixtures thereof, and compounds thereof. Especially preferred $HO_2^-$ disproportionation catalysts include copper, silver, gold, aluminum, indium, tin, lead, arsenic, antimony, bismuth, selenium, tellurium, mixtures thereof, and compounds thereof. Copper, silver, and gold, mixtures thereof, and compounds thereof are especially preferred.

Additionally, in order to accommodate the gas phase reaction and the gas evolution, the particulate cathodes comprise a hydrophobic material. The hydrophobic material may be a polyfluorocarbon, for example, polytetrafluoroethylene, polychlorotrifluoroethylene, polytrifluoroethylene, polyvinylfluoride, polyvinylidene fluoride, and copolymers, including interpolymers and terpolymers having tetrafluoroethylene, trifluoroethylene, chlorotrifluroethylene, vinylidene fluoride, and vinyl fluoride.

The cathode herein contemplated is utilized with an oxidant. The oxidant is oxygen. By oxygen is meant both oxygen as a substantially pure gas, and oxygen present with nitrogen and other materials such as carbon dioxide, carbon monoxide, water vapor and the like as found in air. Thus, according to one particularly desirable exemplification of the method of this invention, air is fed to the catholyte compartment of the cell. Additionally, excess oxygen may be fed to the catholyte compartment of the cell, for example, a 50 percent to 200 percent stoichiometric excess of oxygen may be fed to the cell.

The cathode structure itself, as will be described more fully hereinafter, contains a current collector which contacts the porous particles, and is fabricated of an electroconductive material substantially chemically resistant to aqueous alkali metal hydroxides, and having a higher hydrogen evolution over voltage than said particles. In this way, the particles may be closely packed and rendered substantially immobile.

Figure 2:
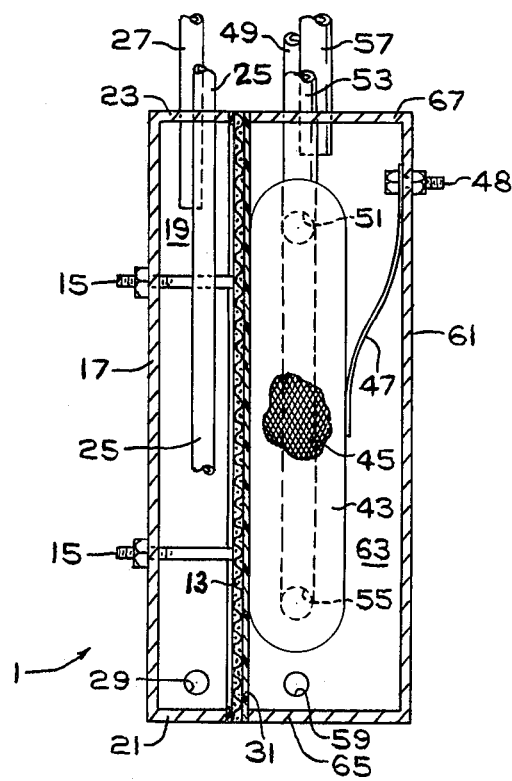
FIG. 2 is a cut-away side elevation of the electrolytic cell herein contemplated, for carrying out the method of this invention.
Figure 3:
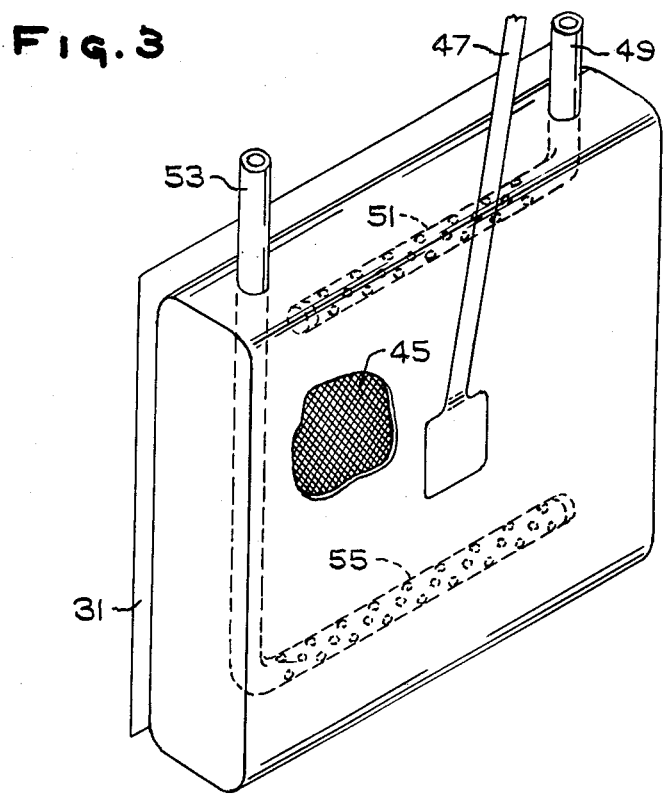
FIG. 3 is an isometric view of a cathode element useful in carrying out the method of this invention.
Figure 4:
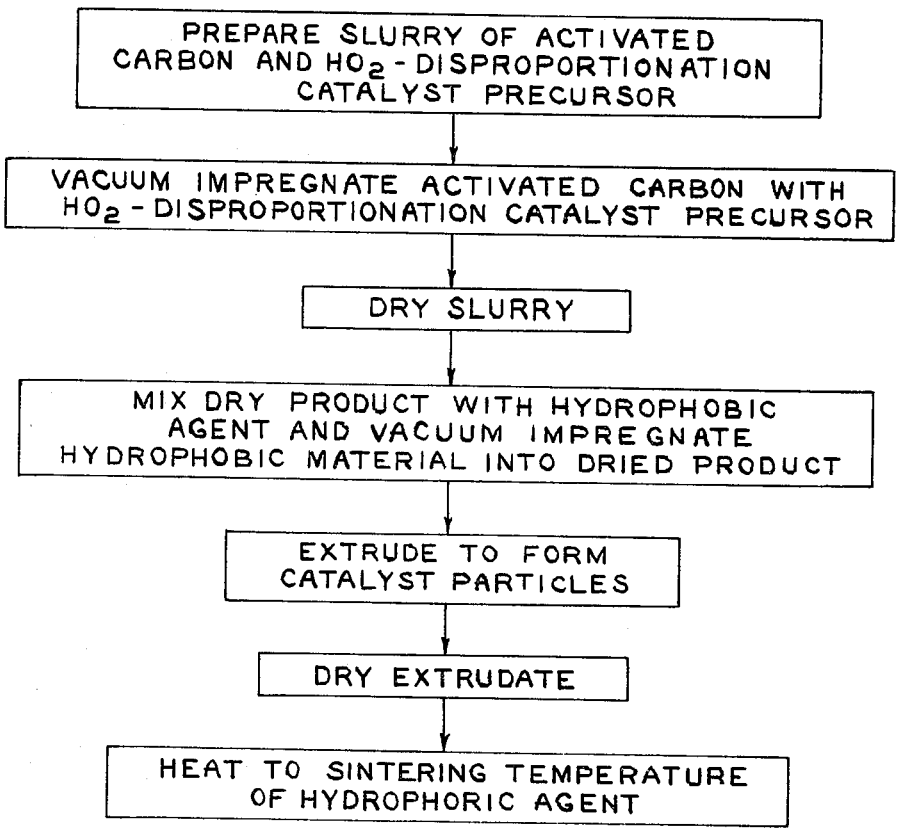
FIG. 4 shows a flow chart for the preparation of cathode electrocatalysts according to the method of this invention.

FIGS. 1, 2 and 3 particularly illustrate an electrolytic cell 1 of one exemplification of this invention. The electrolytic cell 1 has an anolyte compartment 11 with an anode 13 therein. Electrical conductivity is provided to the anode by conductive bus bar 15 which connects the anode 13 to the back wall 17 of the anolyte compartment 11 of cell 1. The anolyte compartment 11 further includes side walls 19, bottom 21 and top 23. Brine feed to the anolyte compartment 11 is through brine feed pipe 25, that is brine feed downcomer 25, while chlorine recovery is through chlorine recovery line 27. Additionally, depleted brine may be recovered, either as a froth with the evolved chlorine through chlorine recovery line 27 or as a liquid through a liquid recovery line 29, or as both a froth and a liquid through both the chlorine recovery line 27 and the liquid recovery line 29.

A membrane or diaphragm 31 separates the anolyte compartment 11 from the catholyte compartment 41. The catholyte compartment 41 includes a cathode bag 43 shown as a fine wire screen bag containing closely-packed catalyst particles 45 therein. Electrical conductivity from the external circuit to the cathode particles is provided by a metal strap 47 joined to current lead 48. Electrolyte feed, that is, water feed or dilute alkali metal hydroxide feed is through an electrolyte feed line 49 to electrolyte distributor 51 which is a perforated plate. Oxidant gas feed, that is, oxygen feed, is through gas feed pipe 53 through gas feed distributor 55. Gas feed distributor 55 may be a substantially perforated pipe in or near the bottom of the cathode bag 43. Gas recovery which may be used to recover nitrogen and carbon dioxide fed with the oxygen through gas feed pipe 53 and gas feed pipe distributor 55 is through gas recovery pipe 57. Liquid recovery pipe 59 is used to recover catholyte liquor.

The catholyte compartment is formed by back wall 61, side wall 63, bottom 65 and top 67.

While the cathode particles 45 may be restrained within a cathode bag 43, as shown in particular detail in FIG. 3, other means of both current conduction and immobilization of the cathode catalyst particles 45 may be utilized. For example, the entire catholyte compartment 41 may be fully packed with the particles 45, with current leads thereto being wires, screens, or plates extending from outside sources of electrical current 48 to the bed of particles 45. When substantially the entire catholyte compartment 41 is filled with the catalyst particles 45, means, for example, screen means, are provided at the electrolyte outlet 59 and gas outlet 57 whereby to retain the catalyst particles 45 within the cathode compartment 41.

As herein contemplated, according to one particularly preferred exemplification of this invention, the cathode particles 45 are closely packed, and substantially immobilized, by being retained within an electrolyte permeable, electroconductive container 43 which serves the combined purposes of immobilizing and packing the catalyst particles 45 while providing electrical conductivity from the external current source 48 through conductor means 47 to the catalyst carrier means 43.

According to one particularly preferred exemplification of this invention, the cathode particles are activated carbon particles, that is, high porosity carbon particles having a porosity of from about 100 to about 1,000 square meters per gram and preferably from about 100 to about 500 square meters per gram, impregnated with an $HO_2^-$ disproportionation catalyst and a hydrophobic water repellent material. The particles are, in one particularly preferred exemplification, substantially cylindrical with a diameter of about 0.1 to about 0.15 inch and a length of about 0.1 to about 0.7 inch and in a particularly preferred exemplification, an aspect ratio, that is, a ratio of length to diameter of about 1.0 to about 7.0.

The catalyst particles herein contemplated may be prepared by forming a slurry of activated carbon and a precursor of the $HO_2^-$ disproportionation catalyst. Typical materials useful in providing the activated or porous carbon include acetylene black, carbon black, coconut charcoal, and the like. Particularly preferred is the acetylene black.

The $HO_2^-$ disproportionation catalyst is preferably gold, silver, or copper. Especially preferred precursor compounds include the nitrates, carbonates, bicarbonates, and sulfates, which may be decomposed to form stable materials by thermal decomposition, during the drying of the slurry. Typically, the slurry contains sufficient activated carbon, and sufficient precursor of the disproportionation catalyst, whereby to provide a catalyst loading of from about 5 to about 35 weight percent catalyst, calculated as the metal, basis weight of the carbon. Especially preferred is a catalyst loading of from about 10 to about 25 weight percent catalyst.

After impregnation of the activated carbon with the $HO_2^-$ disproportionation catalyst precursor, as for example by vacuum impregnation, the resulting slurry is heated to dry the carbon and form the $HO_2^-$ disproportionation catalyst. Thereafter, the $HO_2^-$ disproportionation catalyst containing activated carbon may be mixed with the dispersion of a hydrophobic compound whereby to form a second slurry. The amount of slurry is typically such as to provide a particle containing from about 2 to about 50 and preferably about 2 to about 30 weight percent hydrophobic compound, basis total weight of the hydrophobic compound, weight of the $HO_2^-$ disproportionation catalyst calculated as the metal, and weight of the carbon. The hydrophobic compound is typically a fluorocarbon polymer, for example, polytetrafluoroethylene, polychlorotrifluoroethylene, polytrifluoroethylene, polyvinylidene fluoride, polyvinyl fluoride or a copolymer or a terpolymer containing tetrafluoroethylene, chlorotrifluoroethylene, trifluoroethylene, vinylidene fluoride, and vinyl fluoride moieties. The hydrophobic compound may be impregnated into the carbon product by vacuum impregnation, after which the second slurry is dried, whereby to form a dried carbon particle containing an $HO_2^-$ disproportionation catalyst and a hydrophobic material impregnated therein.

According to the method herein contemplated the slurry may be extruded prior to drying. In this way shaped cathode particles, e.g., cylinders, may be prepared.

Where the hydrophobic material is thermoplastic, the dried carbon particle may be heated to cause the hydrophobic material to become plastic whereby to adhere to the carbon particle. Alternatively, where the hydrophobic material is not thermoplastic but exhibits a sintering temperature, as is the case of polytetrafluoroethylene, the impregnated particle may be raised to the sintering temperature whereby to sinter the polytetrafluoroethylene and form the hydrophobic zones of the catalyst particle.

The resulting catalyst particles typically contain from about 5 to about 30 weight percent silver, gold, or copper, and preferably from about 10 to about 25 percent thereof, from about 2 to about 10 percent, and preferably about 5 to about 8 weight percent, of the hydrophobic waterproofing material.

The use of the above-described materials in an electrolytic cell having an anode compartment separated from a cathode compartment by an ion permeable barrier, whereby to electrolyze alkali metal chloride brines while feeding an oxidant to the catholyte compartment, results in a voltage saving of from about 0.8 to about 1.2 volts.

The following examples are illustrative.

EXAMPLE I

An electrolytic cell was constructed having a cathode of immobilized, coated, porous, carbon particles in a steel screen current collector.

The anode was a five-inch by seven-inch section of louvered titanium mesh having a coating of ruthenium dioxide-titanium dioxide.

The cathode was in the form of coated, porous carbon particles packed in a bag of Newark Wire Cloth Company SANI-GRID ® stainless steel filter leaf. The packed bag was held in place by a stainless steel frame. A section of one-quarter inch stainless steel tubing with slits to fit over the filter leaf bag, and a perforated poly(tetrafluoroethylene) tube was fitted inside the stainless steel tubing as a gas distributor. A second one-quarter inch stainless steel tube was inserted at the top of the bag for electrolyte introduction and gas removal.

The anode and cathode were separated by a 0.30 pound per square foot asbestos diaphragm reinforced with ten weight percent Allied Chemical Corp. HALAR poly(ethylene-chlorotrifluoroethylene). The metal-to-metal gap, through the diaphragm, was 5 to 7 millimeters.

The catalyst particles were prepared by impregnating Fisher Scientific Co. 6-14 mesh activated coconut charcoal with an aqueous solution of $Ag_2CO_3$ and $NH_4OH$. The carbon was impregnated by evacuation in a vacuum chamber while in contact with the solution. Release of pressure forced the solution into the pores of the activated charcoal. This was carried out three times, after which the impregnated carbon particles were dried at 110 degrees Centigrade, and heated for one hour at 300 to 350 degrees Centigrade in a nitrogen atmosphere.

The particles were then rendered hydrophobic by impregnation with DuPont TEFLON 30B dispersion of polyperfluoroethylene. The carbon particles were impregnated by evacuation in a vacuum chamber while in contact with the dispersion. Evacuation was carried out three times, drying at 110 degrees Centigrade, and then sintering for one hour at 300 to 350 degrees Centigrade in a nitrogen atmosphere.

The resulting particles contained 9.8 weight percent silver and 1.0 weight percent polytetrafluoroethylene.

The particles were then placed into the stainless steel filter leaf bag and the cell was assembled.

Electrolysis was carried out at a current density of 50 Amperes per square foot, with a 176 percent excess of oxygen.

The cathode potential was minus 0.38 volt versus a normal hydrogen electrode.

EXAMPLE II

The procedure of Example I was followed except that the particles contained 19.5 weight percent silver and 2.0 weight percent poly(tetrafluoroethylene). The cathode potential was minus 0.38 volt at 50 Amperes per square foot.

EXAMPLE III

The procedure of Example I was followed except that the cathode particles were prepared by adding 7.7 grams of $Ag_2CO_3$ in water and $NH_4OH$ to 30 grams of Shawinigan Products Corp. acetylene black, and sufficient water to make 280 milliliters of slurry. The slurry was vacuum impregnated twice and then dried at 50 degrees Centigrade for 16 hours. Ten grams of the silver treated carbon black were then mixed with 1.7 grams DuPont TEFLON 30B poly(tetrafluoroethylene) dispersion in 55.8 grams of water and 1 gram of ethanol.

The slurry was vacuum impregnated twice, extruded, dried at 110 degrees Centigrade for 16 hours, heated to 250 degrees Centigrade for 30 minutes, and then sintered in nitrogen at 400 degrees Centigrade for four hours.

The resulting extruded pellets, measuring 0.25 to 0.50 inch long by 0.125 inch diameter, and containing 10 weight percent silver and 5 weight percent poly(tetrafluoroethylene), were packed into the stainless steel current collector and utilized as a cathode as described in Example I, above. The cathode potentials shown in Table I, below, were obtained.

TABLE I

| Cathode Potential Versus Current Density | |
|---|---|
| Current Density (Amperes Per Square Foot) | Cathode Potential (Voltage versus Normal Hydrogen Electrode) |
| 50 | 0.12–0.13 |
| 65 | 0.15 |
| 75 | 0.17–0.18 |
| 84 | 0.20 |
| 100 | 0.24–0.33 |

EXAMPLE IV

The procedure described in Example III, above, was followed, except that the reacting particles contained 10 weight percent silver and 10 weight percent poly(tetrafluoroethylene). The cathode potentials shown in Table II, below, were obtained.

TABLE II

| Cathode Potential versus Current Density | |
|---|---|
| Current Density (Amperes Per Square Foot) | Cathode Potential (Voltage versus Normal Hydrogen Electrode) |
| 50 | 0.25–0.31 |
| 70 | 0.33–0.34 |
| 100 | 0.33–0.49 |

I claim:

1. A method of preparing electroconductive, catalytic particles comprising the steps of:
   (a) forming a slurry of activated carbon and a thermally decomposable silver compound;
   (b) impregnating the activated carbon with the thermally decomposable siver compound;
   (c) drying the slurry whereby to form dried carbon product;
   (d) thereafter mixing the dried carbon product with a dispersion of a hydrophobic compound to form a second slurry;
   (e) impregnating the hydrophobic compound into the carbon product;
   (f) forming the second slurry into particles; and (g) thereafter heating the particles formed from the second slurry whereby to dry the particles, sinter the hydrophobic compound, and form electroconductive, catalytic, sintered particles having silver $HO_2^-$ disproportionation catalyst impregnated carbon and hydrophobic material.

2. The method of claim 1 wherein the activated carbon has a surface area of about 100 to 1,000 square meters per gram.

3. The method of claim 1 wherein the activated carbon is acetylene black.

4. The method of claim 1 comprising vacuum impregnating the activated carbon with the thermally decomposable silver compound.

5. The method of claim 1 comprising heating the dried carbon to form $HO_2^-$ disproportionation catalyst.

6. The method of claim 1 comprising vacuum impregnating the hydrophobic compound into the carbon product.

* * * * *